F. R. LONG.
FORGING MACHINE FOR MAKING HOLLOW BODIES.
APPLICATION FILED JAN. 28, 1916.
1,211,193.
Patented Jan. 2, 1917.
7 SHEETS—SHEET 2.
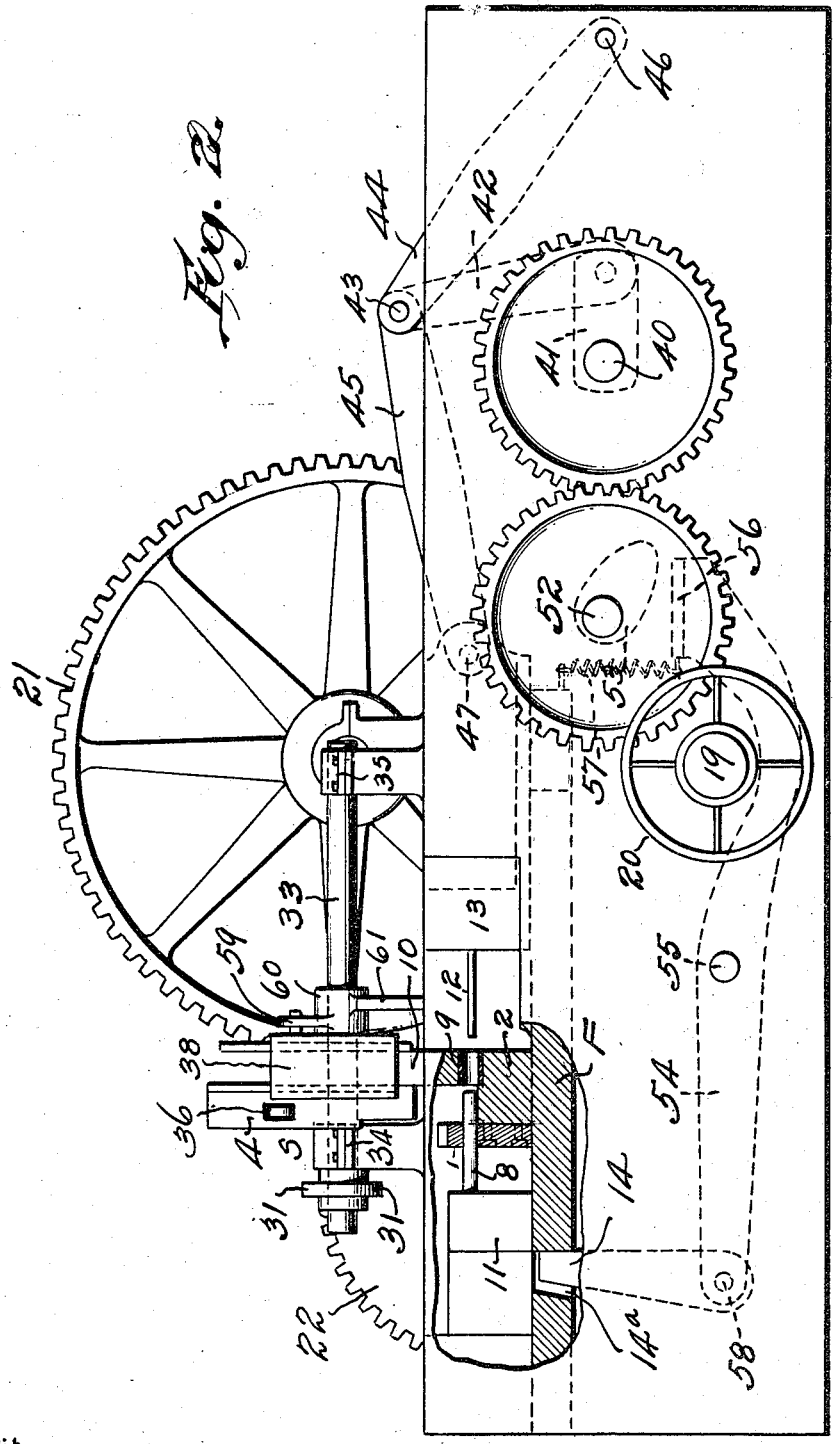
Inventor
FRED R. LONG.

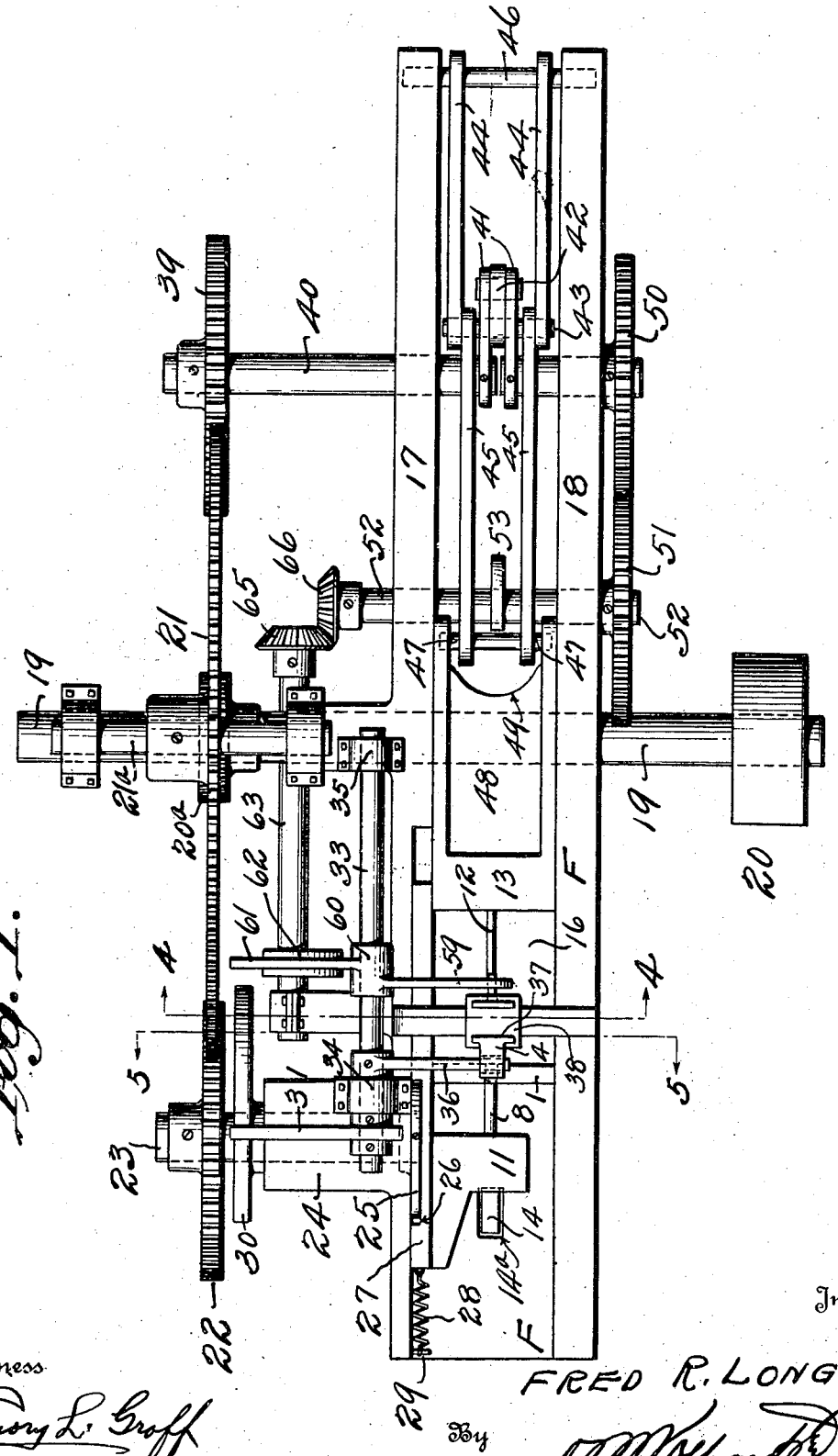

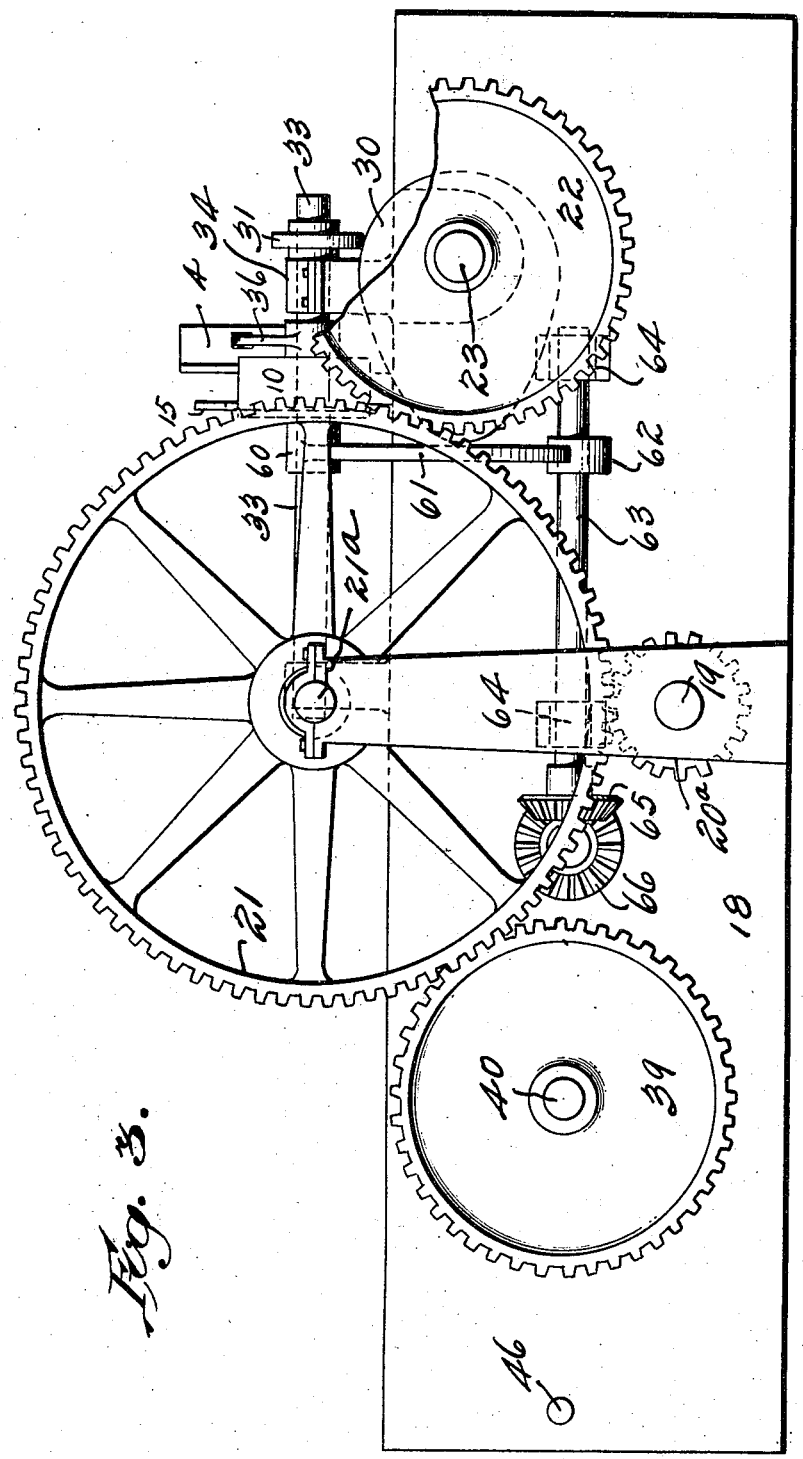

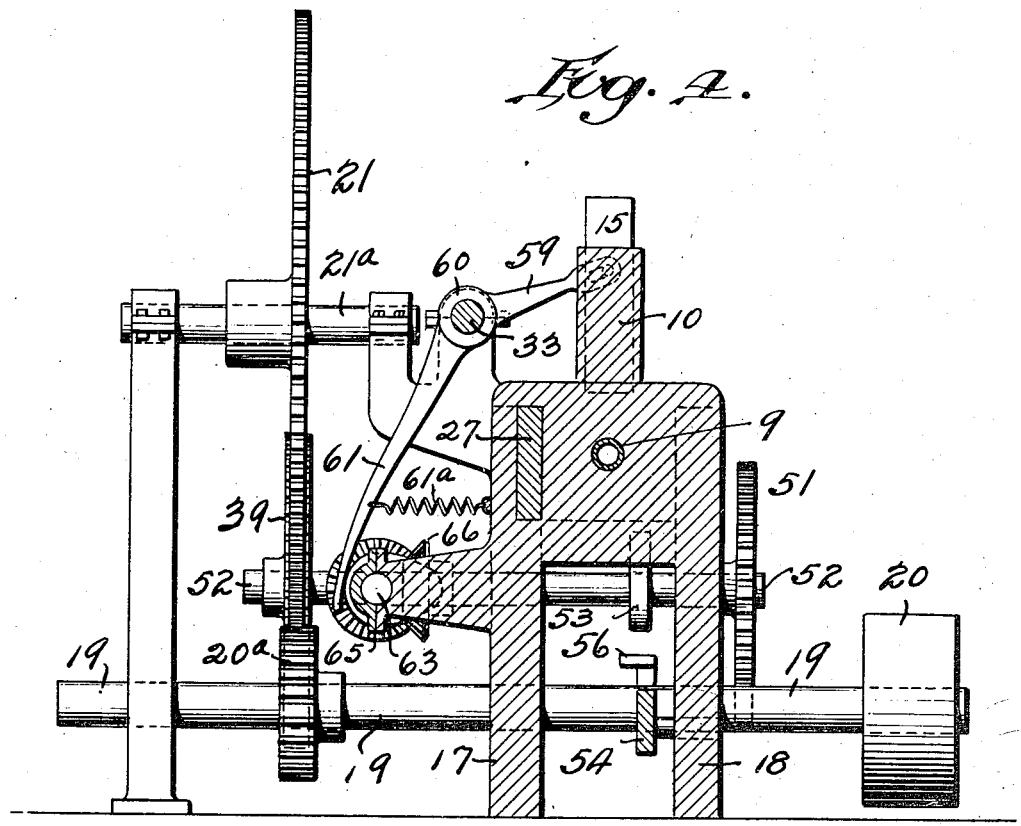
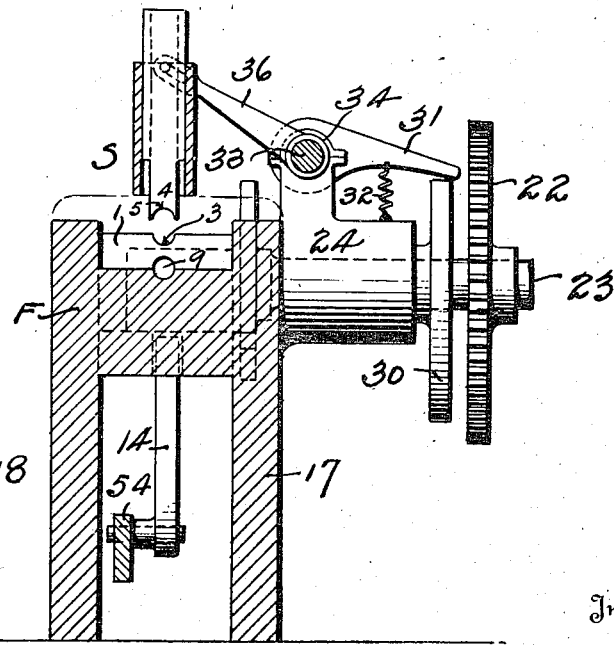

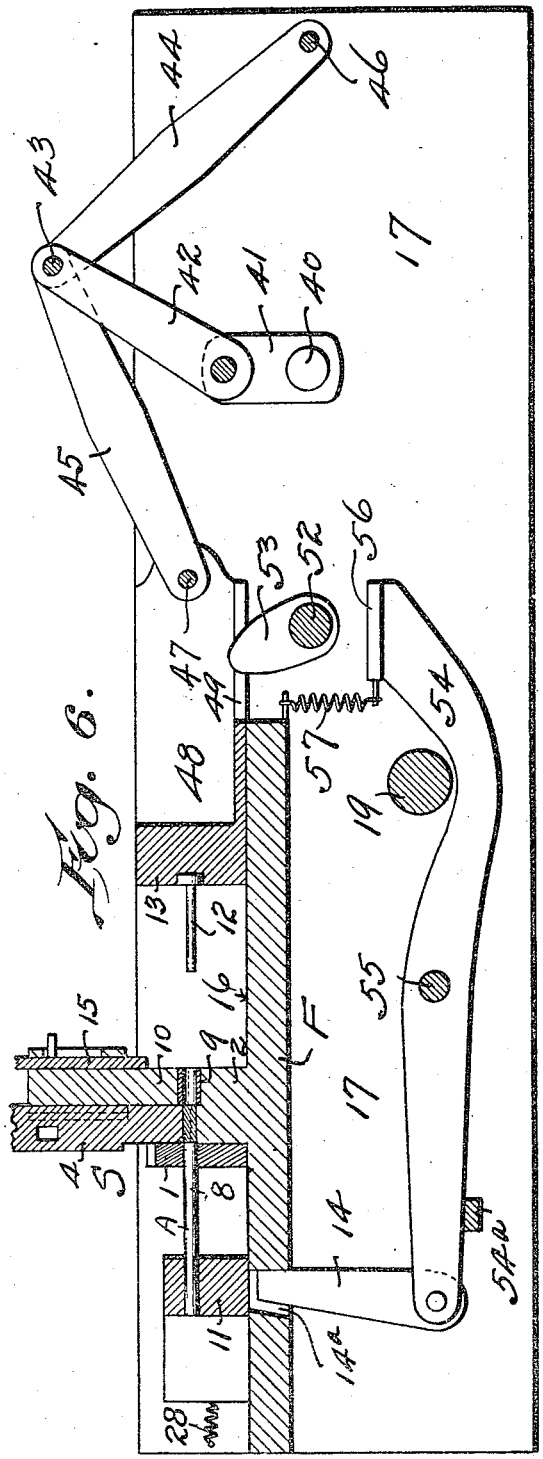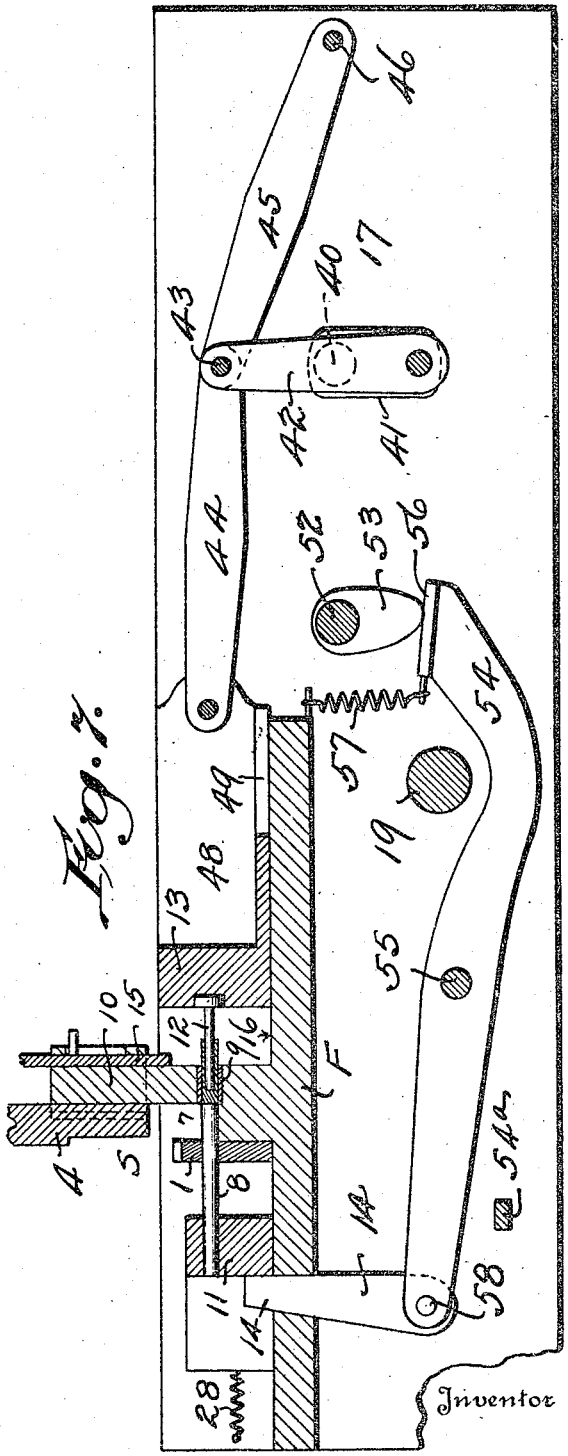

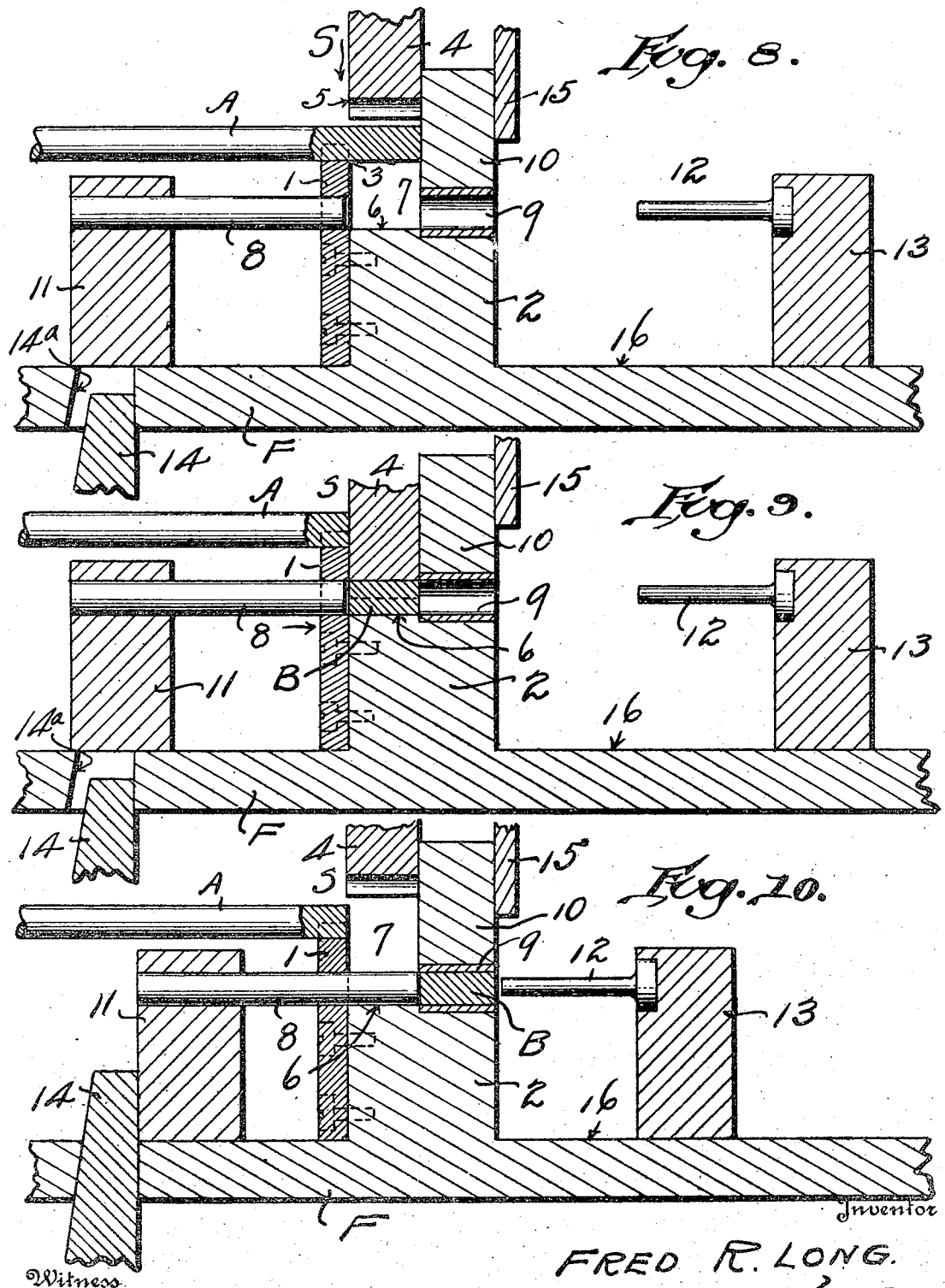

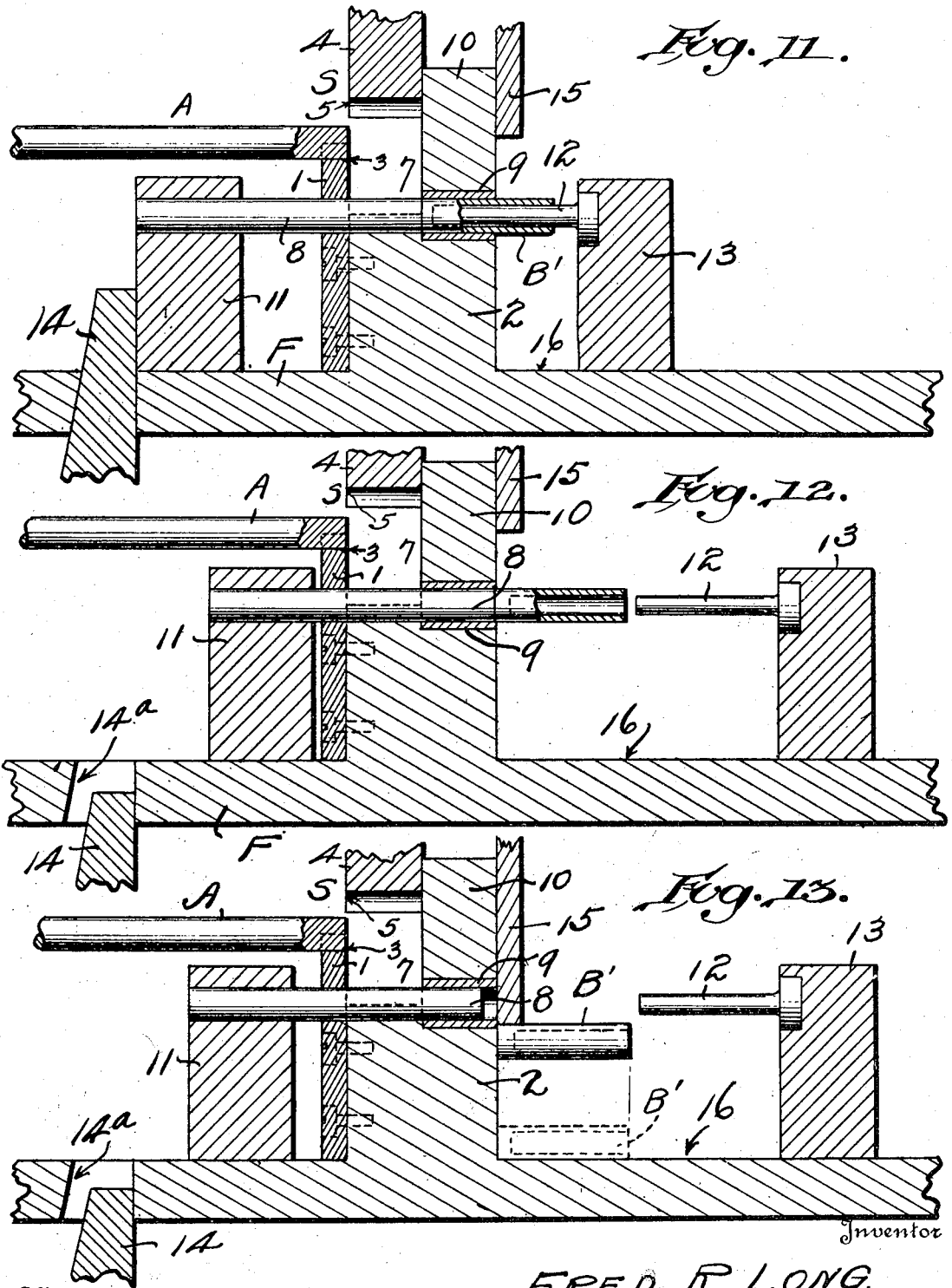

UNITED STATES PATENT OFFICE.

FRED R. LONG, OF CATAWISSA, PENNSYLVANIA.

FORGING-MACHINE FOR MAKING HOLLOW BODIES.

1,211,193.   Specification of Letters Patent.   Patented Jan. 2, 1917.

Application filed January 28, 1916. Serial No. 74,899.

*To all whom it may concern:*

Be it known that I, FRED R. LONG, a citizen of the United States, residing at Catawissa, in the county of Columbia and State of Pennsylvania, have invented certain new and useful Improvements in Forging-Machines for Making Hollow Bodies, of which the following is a specification.

This invention relates to the general subject of forging, and more particularly to an improvement in forging machines for making hollow bodies such as high explosive shells.

A primary object of the invention is to provide a novel and practical machine which will produce the hollow bodies with great rapidity and with precision from heated blanks of uniform length, which are severed from a stock-piece by one of a series of timed operations to which the metal is subjected during its progress through the apparatus.

Another object of the invention is to provide a machine which produces the hollow bodies without waste of material, thereby increasing its efficiency and enhancing its value from a practical and commercial standpoint.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which—

Figure 1 is a top plan view of the machine. Fig. 2 is a side elevation partly in section. Fig. 3 is a rear side elevation of the machine. Fig. 4 is a cross section on the line 4—4 of Fig. 1. Fig. 5 is a cross section on the line 5—5 of Fig. 1. Fig. 6 is a vertical longitudinal sectional view showing the normal position of parts. Fig. 7 is a view similar to Fig. 6 showing the parts in working position. Fig. 8 is a diagrammatic view showing the relative position of the working parts of the machine prior to severing a body blank from the bar stock. Fig. 9 is a diagrammatic view illustrating the second step performed by the machine, wherein the body blank is cut from a bar stock ready for being positioned in the die. Fig. 10 is a diagrammatic view showing the body blank positioned in the die with the piercing tool about to enter the end of the body blank. Fig. 11 shows the positioning anvil held stationary at the rear end of the die, and the piercing tool forming the hollow body. Fig. 12 shows the positioning anvil advancing through the die to eject the hollow body, with the piercing tool receded and the auxiliary ejector means about to come into play. Fig. 13 is a view showing the auxiliary ejector device assisting in the removal of the finished hollow body from the mouth of the die.

Similar reference characters designate corresponding parts throughout the several figures of the drawings.

A novel and distinctive feature of the present invention is the construction and arrangement of parts thereof, whereby a heated stock-piece or bar may be rapidly and easily handled, thereby conserving the heat of the bar and thus producing a body blank which is capable of being worked upon in a highly efficient manner, and at the same time utilizing the metal to the most economical advantage. Accordingly, as will be most easily observed from the group of diagrammatic views 8 to 13 inclusive, it is proposed to employ a stock-piece of suitable diameter according to the character of the work to be performed, which is heated to a suitable temperature, at which it may be easily and readily worked into the desired final form. This stock-piece is designated in the drawings as A, and as will be first observed from Fig. 8, the same normally rests upon the upper edge of a stock support 1, which may conveniently be detachably fitted to the die holder block 2, and which also constitutes the stationary or ledger blade of a shearing device. This shearing device is designated generally by the letter S and includes the said stationary blade 2 with its cutting edge 3, and the reciprocating shear blade 4. This shear blade is preferably of substantially the same width as the body blank, and when moved downwardly in the direction of the arrow shown in Fig. 8, its shearing edge 5 coöperates with the shearing edge 3 of the blade 2 to sever and displace the body blank B. After being cut from the stock, this body blank falls to the floor 6 of the blade clearance space 7 with the assistance of the follower function of blade 4 as shown in Fig. 9, where it is placed in the path of a horizontally moving positioning anvil-plunger 8, and also in line with a tubular restraining die 9 fitted in a die opening in the die holder block 2 at a point where the latter is formed with an upstanding spacing wall 10.

When the body blank B is in the position shown in Fig. 9, the movable blade 4 of the shearing device begins to recede or return to its normal position, while the positioning plunger 8 mounted on the carrier block 11 advances in the direction shown by the arrow in Fig. 9 to advance the body blank into the restraining die 9. While the positioning plunger is advancing the body blank into the restraining die, a piercing tool 12, mounted on a reciprocating tool head 13, also advances toward the mouth of the die, so that by the time the positioning plunger reaches the rear end of the die and comes to rest thereat, the said piercing tool is about in position to penetrate the body of metal at front end of the body blank, as shown in Fig. 10.

During the piercing operation, illustrated in Fig. 11, the positioning plunger 8 is held rigid and stationary to become an anvil by means of a locking abutment 14 which solidly engages the rear side of the carrier block 11. This stationary position of the block 11 maintains the end of the positioning plunger 8 directly at the rear end of the die 9, thus constituting a rigid and firm anvil for the body blank while being operated upon by the piercing tool 12. A feature of special importance to be noted at this point is the fact that, the locking abutment 14 is preferably of tapered form, and operates in a similarly shaped opening 14$^a$ in the metal frame F of the machine. Hence, when the said abutment is moved to the position shown in Figs. 10 and 11 it not only solidly engages with the metal machine frame F, but also solidly engages with the carrier 11 on which the positioning plunger 8 is mounted. Therefore, the anvil which takes the shock of, and resists the piercing operation is made up of a positioning plunger 8, the carrier block 11, the abutment 14 and the machine frame F. By reason of such construction and the use of a restraining die 9, the movement and displacement of the metal due to the piercing operation can only be through the then open mouth of the die forwardly and over the piercing tool. The extent of outward flow of metal from the open portion at the end of the die depends entirely upon the character of the work being performed. That is to say, the metal is caused to flow outwardly over the piercing tool to a required and predetermined extent according to the length of the shell body or equivalent hollow body being made.

As will be observed from Fig. 11, when the piercing tool 12 has penetrated the body blank to the required degree, the shear blade 4 is back in its normal position, and the auxiliary ejector member or kick-off 15 which operates on the face of the spacing wall 10 opposite the shear blade 4, is still in its normal position. However, as will be observed from Fig. 12, after the solid blank has been made into a hollow body, the positioning plunger 8 proceeds from the position which it occupies in Figs. 10 and 11 to a position farther forward, whereby the end thereof passes through the restraining die 9 to displace the formed hollow body therefrom. Upon the forward movement of the plunger 8, the tool head 13 moves backwardly carrying with it the tool 12 thus freeing the latter from engagement with the formed hollow body, and at the same time returning to its normal position. After the positioning plunger 8 has made its full forward stroke, the completed or finished hollow body B' is positively assisted in becoming disengaged from the mouth of the die by means of the auxiliary ejector member 15 which moves downwardly as shown in Fig. 13 to remove the body B' from the position shown in full lines to the position shown in dotted lines, that is to the floor 16 of the frame F of the machine. After the hollow body is thus formed it will be apparent that all of the operating parts are ready for the next operation, since they occupy at the end of each complete cycle the position shown in Fig. 8, and in which the device is ready to sever another body blank from the stock piece.

The foregoing description specifies the character and function of the active elements of the machine, which may be termed the main forging unit itself, that is, the unit in which the metal is held and operated upon by the machine. These elements may be operated by various mechanical movements, but preferably by the machine elements and movements illustrated in Figs. 1 to 7 inclusive of the drawings. Reference will now be made to these drawings to complete the entire description of the machine. As will be observed from the first of these figures, the present machine includes a substantial framework F whose various dimensions and design are proportioned in accordance with the heavy character of the work designed to be performed thereby. This framework primarily comprises the opposite vertical side frame members 17 and 18 and has journaled in the lower portion thereof at an intermediate point a transversely disposed drive shaft 19 having the power pulley 20 at one end and a driving gear 20$^a$ at the other which meshes with a suitable relatively large driving gear 21, mounted on an elevated transversely disposed stub shaft 21$^a$. From this driving gear 21, all of the several moving parts of the apparatus are moved in proper synchronism, and in this connection, it will be observed that the same meshes with a plunger controlling gear 22 mounted on a stub shaft 23 at the forging unit end of the machine. This stub shaft which carries the gear 22 rigidly therewith is journaled in a suitable off-set bearing 24, and is provided at its inner end with a carrier operating cam 25 which is adapted to work in a cam recess 26 formed in the vertically arranged guide wall 27 fitted to the block 11 carrying the positioning plunger 8. To render the operation of the block 11 more accurate, the end of the wall 27 has preferably attached thereto one end of a spring 28, the other end of which is made fast as at 29 to the framework of the machine, thus maintaining one edge of the cam recess always in contact with the working face of the cam. Therefore, it will be clear that the forward movement of the positioning anvil 8 is positively accomplished by means of a cam, while its backward movement is facilitated by the spring 28.

In addition to carrying the gear 22 and the cam 25, the shaft 23 also carries a shear operating cam 30 whose working periphery is of such a character, that with the aid of suitable intermediate levers, the shear blade 4 of the shearing device S is operated prior to the advancing of the positioning plunger 8. As will be seen from Figs. 3 and 5, this cam 30 is adapted to operate a lever arm 31 rigidly carried by a longitudinally disposed lever shaft 33 against the tension of the spring 32. With further reference to said shaft, it will be observed that the same is journaled as at 34 and 35, and also has rigid therewith at the side of the bearing 34 opposite the lever 31, a shear operating lever 36, the forward end of which loosely engages with the shear blade 4 that is slidably mounted as indicated at 37 in a guide casing 38 carried by the spacing wall 10 of the die holder block 2. Accordingly, it will be apparent that the arrangement of parts described, permits of the shear blade 4 operating in advance of the positioning plunger 8 to sever a body blank from the stock-piece and in this way, the gear 23 with its connections accomplishes the preliminary operation of parts of the machine.

Referring now to the subsequent operations, accomplishing the steps illustrated more particularly in Figs. 10 to 13 of the drawings, it will be observed that the driving gear 21 also meshes with a ram controlling gear 39 carried upon a crank shaft 40 mounted transversely of the machine and at one side of the said drive shaft 19. This crank shaft 40 as will be observed from Figs. 1, 2, 6, and 7 is provided with a crank arm 41 which has pivotally attached thereto a link 42 connecting with the intermediate cross pivot 43 of a toggle device comprising the paired extensible arms 44—44 and 45—45. The said arms 44—44 of this toggle device turn on a fixed pivot 46 at the extreme end of the machine, and like the paired arms 45—45 operate in the space between the vertical walls 17 and 18 of the framework. The forward end of the paired arms 45—45 of the toggle are pivotally connected as at 47 with a reciprocatory ram 48 having at its front end the tool head 13, and having its bottom wall which slides upon the floor 16 of the framework provided with a cam clearance 49. This particular construction is designed to provide great power for the piercing stroke of the ram 48 which reciprocates in the guideway formed by the walls 17 and 18 of the frame and the delivery floor 16.

The end of the crank shaft 40 opposite the gear 39 is provided with another gear 50 which is located on the front side of the machine, and which meshes with a locking abutment controlling gear 51 carried by one end of a transverse counter-shaft 52 arranged between the crank shaft 40 and the main drive shaft 19. This countershaft 52 is provided with a suitable cam 53 which is capable of operating the locking abutment lever 54 pivoted as at 55 between the side walls 17 and 18 of the machine beneath the delivery floor 16 thereof. The end of the lever 54 nearest the cam 53 is provided with a cam abutment face 56 and is also provided with a spring connection 57 which tends to maintain the lever in its normal position, that is, so that the locking abutment 14 pivotally carried at the opposite end of the lever as at 58 will be normally in a concealed position below the plane of travel of the carrier block 11 as shown in Figs. 2 and 6, and so that the lever will rest against the stop 54ª. However, when the carrier block 11 is advanced to working position, the cam 53 will hold the locking abutment 14 in the position shown in Fig. 13 by means of the lever 54 as shown in Fig. 7. In connection with this part of the apparatus, it will be observed that the gearing and connections between the shaft 52 and the drive gear 21 are such that the tapered locking abutment 14 will rise upwardly into the tapered opening 14ª to lock the carrier block 11 rigid with the frame F prior to the end of the tool 12 coming in contact with the exposed face of the body blank B.

As has been previously indicated, the positioning plunger 8 after serving as an abutment or anvil for the body blank while being operated upon by the piercing tool 12 is advanced through the restraining die 9 so as to eject the finished blank B'. However, to eliminate any possibility of the blank becoming caught at the mouth of the die, the device is provided with an auxiliary ejecting device or kick-off in the form of a reciprocating blade 15 which comes into play while the other working parts of the apparatus are returning to normal position. For the purpose of effecting this operation, the movable blade 15 has connected thereto one arm 59 of a lever device which comprises a hub portion 60 loosely mounted on the shaft 33 and also carrying rigid therewith, a cam lever 61 which is held in contact with the working edge of an operating cam 62 by a spring 61ª. The said cam 62 is carried upon a cam shaft 63, journaled as at 64 to the framework of the machine, and carrying at one end a bevel gear 65 which meshes with a bevel gear 66 carried by the end of the shaft 52 opposite the gear 51. Thus, by this arrangement of gears, cams, and levers, the auxiliary ejector member is operated as a final step in each cycle of the machine.

From the foregoing description, it is thought that the several steps of the operation of the present machine will be entirely clear, and it is also believed that the sequence of operations will be readily apparent. Furthermore, it will be understood that various changes in the form, proportion, and minor details of construction may be resorted to without departing from the spirit of the invention or scope of the appended claims.

I claim:

1. A forging machine for making hollow bodies, including a die, an automatic shear operating at one side of the die, a positioning plunger at one side of the die and operating as an anvil member, a temporary locking abutment for said positioning plunger, and a piercing tool operating in opposition to said plunger.

2. A forging machine for making hollow bodies, including a die, an automatic shear operating at the feeding-in side of the die, a combined positioning and ejecting plunger coöperating with the die, said plunger operating as a stationary anvil at one stage and as an ejector at a later stage of the operation, a movable locking element for temporarily holding said plunger rigidly in position while functioning as an anvil, and a piercing tool operating in opposition to said plunger.

3. A forging machine for making hollow bodies, including a die, an automatic shear operating at one side of the die, a positioning plunger at one side of the die and operating as an anvil member, a vertically movable member for temporarily locking said plunger rigidly in position, and a piercing tool operating in opposition to said plunger.

4. A forging machine for making hollow bodies, including a frame, a die mounted in said frame, an automatic blank shear operating at one side of the die, a positioning plunger also at one side of the die and operating as an anvil member, means for rigidly locking the plunger with said frame so that the latter constitutes with the plunger a part of the anvil, and a piercing tool working in opposition to said plunger.

5. A forging machine for making hollow bodies, including a rigid frame, a die holder including a restraining die carried by said frame, a shearing device operating at one side of the die, a positioning plunger also at one side of the die, and acting as an anvil member, means for rigidly and solidly locking said plunger with said frame so that the latter becomes a part of the solid anvil, and a piercing tool operating in opposition to said plunger.

6. A forging machine for making hollow bodies, including a rigid frame having an opening, a die in said frame, an automatic shearing device operating at one side of the die, a positioning plunger also arranged at one side of the die and acting as an anvil member, an automatic locking abutment adapted to work in said opening in the frame to temporarily rigidly and solidly lock said plunger with said frame so that the latter constitutes a part of the anvil and a piercing tool working in opposition to said plunger.

7. A forging machine for making hollow bodies, including a rigid frame having a tapered opening, a die holder including a restraining die carried by said frame and spaced from said opening, a shearing device operating at one side of the die, a positioning plunger movable in the space between the die holder and said opening and acting as an anvil member, a tapered locking abutment member for wedging in said tapered opening in the frame to temporarily lock the plunger therewith to constitute a solid anvil, and a piercing tool working in opposition to said plunger.

8. A forging machine for making hollow bodies, including a restraining die, an automatic blank shearing device at one side of the die, a positioning anvil plunger adapted to initially displace the blank from the shear into the die and subsequently pass through the latter, a movable abutment for temporarily locking said plunger in position to perform its anvil function, a piercing tool operating in opposition to said plunger while the same is in its locked position, means for advancing the plunger to displace the pierced blank as the piercing tool recedes, and auxiliary means for displacing the hollow blank from the mouth of the die.

9. A forging machine for making hollow bodies comprising a frame, a die holder having a restraining die, a shearing device including a ledger blade constituting a stock support and arranged to provide a clearance space at one side of the die and also including a movable shear blade coöperating with said ledger blade to sever the stock into body blanks and push the latter to the bottom of the clearance space, anvil-plunger means for positioning the blank in the die, means working in opposition to the plunger for piercing the blank in the die, and means for operating the plunger after the piercing operation for removing the pierced body from the die.

10. A forging machine for making hollow bodies comprising a frame, a die holder block at one end of the frame and including a restraining die, a reciprocatory positioning plunger at one side of the die, a main drive shaft, a shearing device associated with said die-holder, a shaft geared with said main drive shaft, separate cams on said shaft for operating said shearing device and then moving the positioning plunger, an abutment for temporarily locking said plunger controlled by said main driving shaft, piercing means on the opposite side of the die holder block, and means geared with said main drive shaft for operating said piercing means.

11. A forging machine for making hollow bodies comprising a frame, die holder at one end of the frame having a restraining die, a drive shaft mounted transversely of the frame, a main driving gear carried by said shaft, a reciprocatory carrier block arranged at one side of the die holder, a positioning plunger for coöperating with said die, cam means geared with said driving gear for operating the block, a piercing tool adapted to work in opposition to said positioning plunger, means geared to said main driving gear for operating said tool, a locking abutment for said carrier block, a lever pivoted in the frame for operating said abutment, a countershaft having a cam for operating said lever, a shearing device at one side of the die-holder block, an auxiliary displacing member at the other side of said block, and cam means operated from said countershaft for operating said shear and auxiliary devices at spaced intervals.

In testimony whereof I hereunto affix my signature in the presence of two witnesses.

FRED R. LONG.

Witnesses:
J. M. VASTENE,
F. MAX LONG.